US012497802B2

(12) United States Patent
Liao

(10) Patent No.: US 12,497,802 B2
(45) Date of Patent: Dec. 16, 2025

(54) ELECTRONIC LOCK WITH ADJUSTABLE DEAD LATCH CHANNEL LOCATION

(71) Applicant: Yi-Fan Liao, Taoyuan (TW)

(72) Inventor: Yi-Fan Liao, Taoyuan (TW)

( * ) Notice: Subject to any disclaimer, the term of this patent is extended or adjusted under 35 U.S.C. 154(b) by 144 days.

(21) Appl. No.: 18/336,512

(22) Filed: Jun. 16, 2023

(65) Prior Publication Data

US 2023/0392410 A1 Dec. 7, 2023

Related U.S. Application Data

(63) Continuation-in-part of application No. 17/643,633, filed on Dec. 10, 2021, now abandoned.

(30) Foreign Application Priority Data

Feb. 2, 2021 (TW) ................................ 110201288

(51) Int. Cl.
*E05B 15/02* (2006.01)

(52) U.S. Cl.
CPC .... *E05B 15/024* (2013.01); *E05B 2015/0275* (2013.01)

(58) Field of Classification Search
CPC .. E05B 15/0245; E05B 15/02; E05B 15/0205; E05B 15/022; E05B 15/024; E05B 47/0046; E05B 47/0047; E05B 2015/0275; E05B 2015/0265; E05B 63/0056
See application file for complete search history.

(56) References Cited

U.S. PATENT DOCUMENTS 8,146,966 B1 * 4/2012 Webb .................. E05B 47/0047 292/341.15
8,157,302 B1 * 4/2012 Webb .................. E05B 47/0047 292/341.15
9,476,227 B2 * 10/2016 Scheffler ............... E05B 15/024
9,580,935 B2 * 2/2017 Singh .................. E05B 63/0056
2008/0006069 A1 * 1/2008 Liao .................... E05B 63/0065 70/413
2010/0078944 A1 * 4/2010 Hirschoff ............ E05B 47/0047 292/198
2020/0181947 A1 * 6/2020 Arlinghaus ........... E05B 15/025
2022/0243497 A1 * 8/2022 Liao .................... E05B 47/0046

* cited by examiner

*Primary Examiner* — Christine M Mills
*Assistant Examiner* — Yahya Sidky
(74) *Attorney, Agent, or Firm* — Birch, Stewart, Kolasch & Birch, LLP

(57) ABSTRACT

An electronic lock with adjustable dead latch channel location, comprising: an electronic lock body, having a housing cavity and a latch bolt; a plate, further having a gap for exposing the housing cavity and the latch bolt; a fixed adjust element, the middle section of the fixed adjust element is arranged below the gap, and set a fixed channel; and an active adjust element, having a ramp element relative to the latch bolt, the ramp element having an active channel relative to the positioning channel, and the width of the active channel is narrower than the distance between the pair of the fixing blocks, so the present invention can directly adjust the position of the dead latch channel without disassembling the entire electronic lock from the door frame.

2 Claims, 9 Drawing Sheets

ELECTRONIC LOCK WITH ADJUSTABLE DEAD LATCH CHANNEL LOCATION

This patent application is a continuation-in-part of U.S. patent application Ser. No. 17/643,633, filed on Dec. 10, 2021.

BACKGROUND OF THE INVENTION

1. Field of the Invention

The invention relates to an electronic lock with adjustable dead latch channel location, particularly but not exclusively an electronic lock that can adjust a dead latch channel location directly at the plate of the electronic lock.

2. Description of the Related Art

An electronic lock is used as an access control system. A difference from a generic lock is that an electronic lock cannot be used alone and must be operated with a mechanical lock box (such as a deadbolt lock, etc.). The electronic lock is installed on the door frame to electronically control the lock, so that the mechanical lock box can be directly pushed or pulled open without being used; therefore, the access control system uses the electronic lock, which can be accessed electronically or directly with the key to open the mechanical lock box to achieve the convenience of electric control and manual use.

U.S. Pat. No. 8,157,302B1 discloses an electronic lock. The longitudinal length of the housing cavity is usually much larger than that of the latch bolt, in order to make the housing cavity easy to align to the latch bolt of the mechanical lock box while installing the electronic lock on the door frame, and the latch bolt of the mechanical lock box is also equipped with a dead latch, so the design of the electronic lock must also consider whether the dead latch can be ejected smoothly when the door is opened. This patent provides a ramp element, which guides the latch bolt to exit the electronic lock, with a channel, and the channel on the ramp element is adjusted to align with the dead latch, and then a screw is used to position the ramp element; however, this patent must disassemble the entire electronic lock from the door frame and the locking screw of the electric lock body must be loosened in order to adjust the position of the dead latch channel, which is very inconvenient. Loosening the locking screw of the electric lock body is risky, as the electronic lock may malfunction due to human error during the process.

U.S. Pat. No. 8,146,966B1 discloses an electronic lock. The ramp element (20E) has a recess (80) with a projection or lug (82). A series of lugs or teeth (85) on the sidewall (18) of housing (10) define spaces (88) therebetween which are selectively engageable with lug (82). Once the desired position is achieved, the ramp element (20E) is fixed in place by fasteners (86). The ramp element (20E) can be readjusted if necessary by removing the faceplate (19) to access the fasteners. Once the adjustment is made, the faceplate is reattached to the strike housing (10). The adjustment feature, such as set screws (86), are concealed by the faceplate plate and not readily accessible.

The ramp element (20) of U.S. Pat. No. 8,157,302B1 and the ramp element (20E) of U.S. Pat. No. 8,146,966B1 are both arranged in the strike housing (10), and hidden by the faceplate (19); therefore, if the electronic lock is already installed on the door frame, to adjust the position of the ramp element (20/20E), the entire electronic lock has to be removed from the door frame and then the faceplate (19) has to be removed, so as to adjust the ramp element (20/20E). This process is inconvenient, and the other unit in the strike housing (10) may be touched by mistake and damaged during the process.

SUMMARY OF THE INVENTION

It is a primary objective of the present invention to solve the problem that the electric lock must be uninstalled from the door frame and the screw must be loosened in order to adjust the position of the dead latch channel, thereby providing the improvements that one doesn't need to uninstall the electric lock and the screw, and one can adjust the dead latch channel location directly at the plate of the electronic lock.

In order to achieve the above objectives, a first embodiment of the present invention includes: an electronic lock body, having a housing cavity and a latch bolt; a plate, using a plate screw combined to the electronic lock body, and beside covering the electronic lock body, the plate extended upward and downward to the opening side of the plate, further having a gap for exposing the housing cavity and the latch bolt; a fixed adjust element, two ends of the fixed adjust element are combined to the bottom surface of the plate by an adjusting screw, the middle section of the fixed adjust element is arranged below the gap, and set a fixed channel; and an active adjust element, sleeved on the middle section of the fixed adjust element and corresponding to the latch bolt set a ramp element, arranged between the bottom surface of the plate and the middle section of the fixed adjust element, the ramp element having an active channel relative to the positioning channel, and the width of the active channel is narrower than the width of the fixed channel.

A second embodiment of the present invention includes: an electronic lock body, having a housing cavity and a latch bolt; a plate, using a plate screw combined to the electronic lock body, and beside covering the electronic lock body, the plate extended upward and downward to the opening side of the plate, further having a gap for exposing the housing cavity and the latch bolt; a fixed adjust element, using an adjusting screw to combine a pair of fixing blocks to the bottom of the plate, the fixing blocks has a sliding slot; and an active adjust element, having a sliding element on two ends which set to the sliding slot, making the top surface of two ends of the active adjust element higher than the top surface of the fixing blocks, and let the active adjust element arranged between a bottom surface of the plate and the fixing blocks, the middle section of the active adjust element set a ramp element relative to the latch bolt, the ramp element having an active channel, and the width of the active channel is narrower than the distance between the pair of the fixing blocks.

Whereby, after installing the plate on the door frame so that the housing cavity is aligned with the latch bolt of the mechanical lock box, if the active channel is not aligned with the dead latch of the mechanical lock box, then one may loosen the adjusting screw to let the active adjust element and the fixed adjust element be shifted relative to each other, to thereby align the active channel of the active adjust element with the dead latch of the mechanical lock box, and then may tighten the adjust screw to return the active adjust element and the fixed adjustment element to an occlusion state.

DETAILED DESCRIPTION OF THE PREFERRED EMBODIMENT

Figure 1:
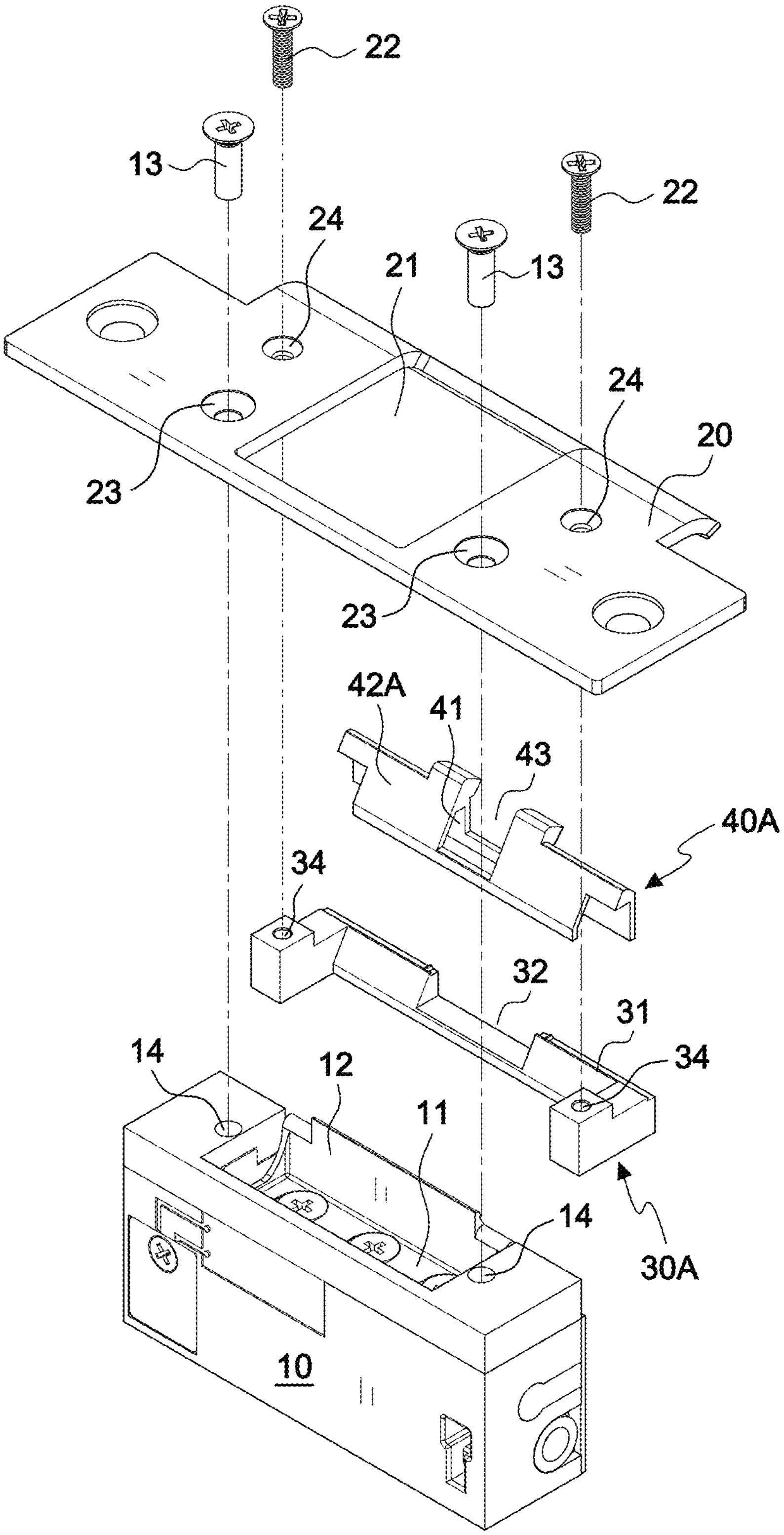
FIG. 1 is an exploded perspective view of a first embodiment of the present invention.
Figure 2:
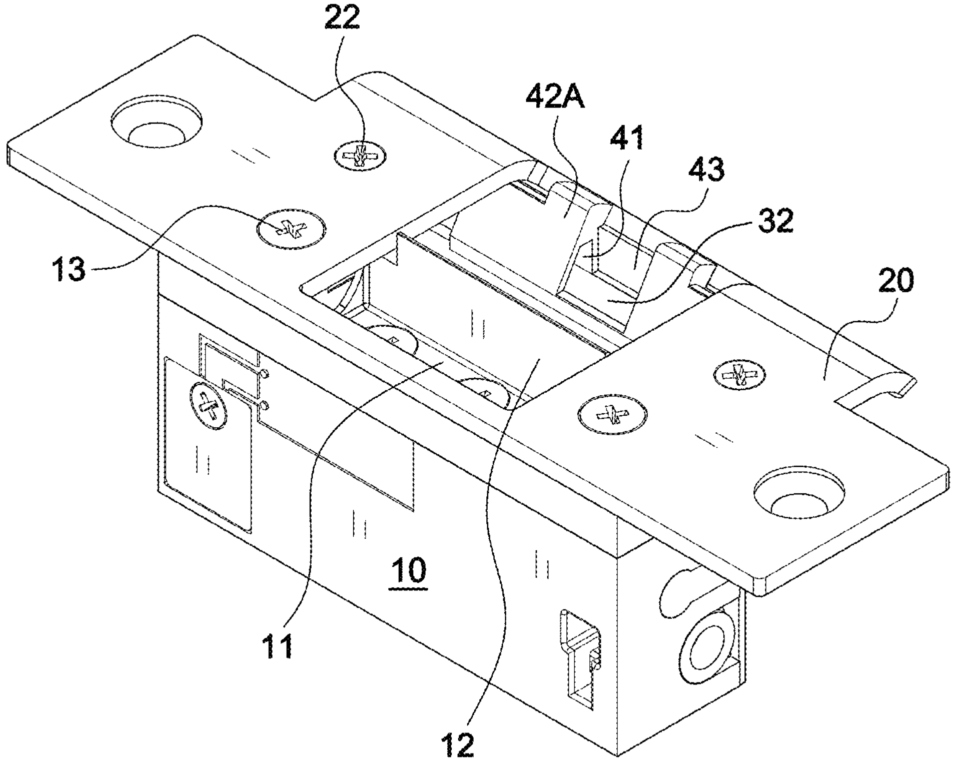
FIG. 2 is a perspective view of the first embodiment of the present invention.
Figure 3:
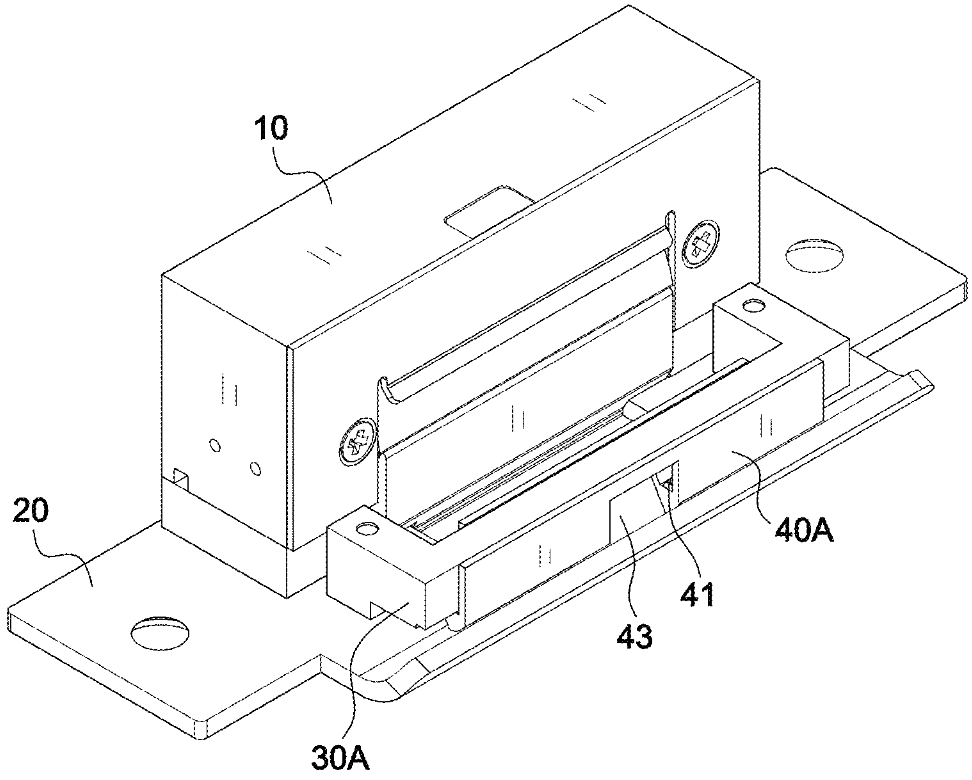
FIG. 3 is a perspective bottom view of the first embodiment of the present invention.
Figure 4:
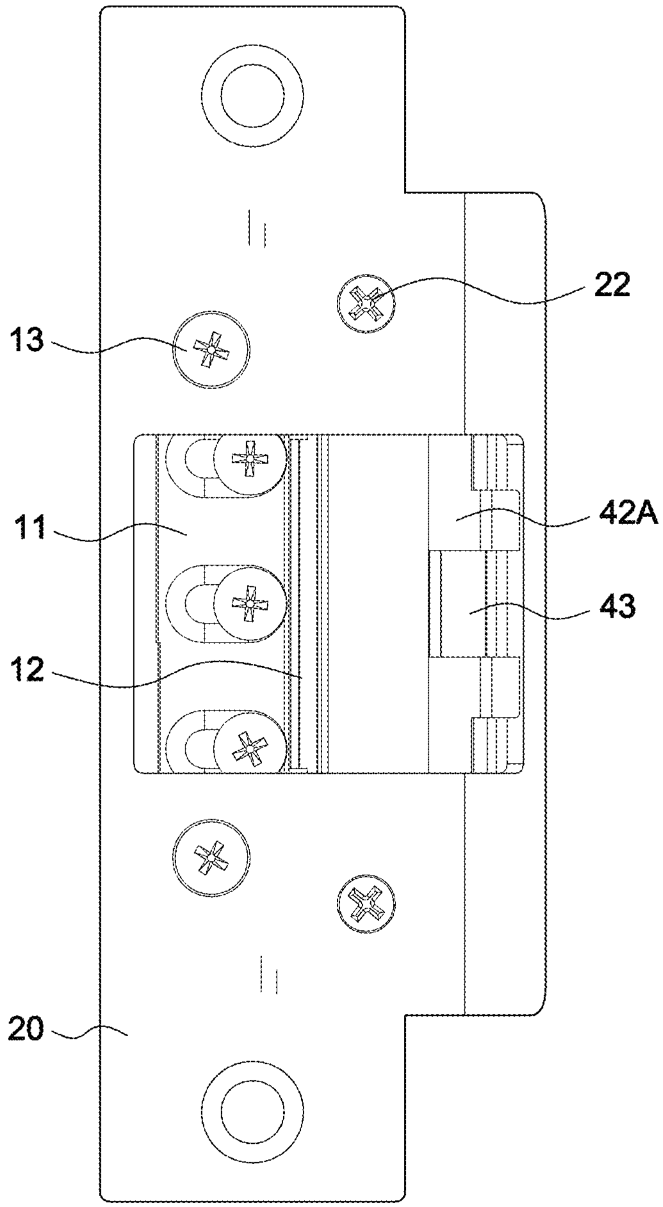
FIG. 4 is a top view of the first embodiment of the present invention.
Figure 5:
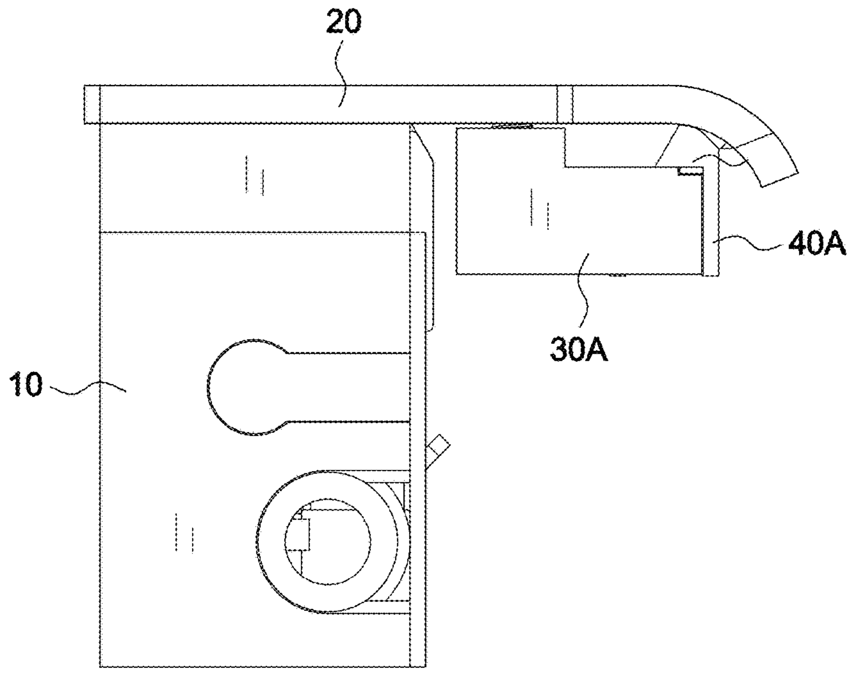
FIG. 5 is a right view of the first embodiment of the present invention.
Figure 6:
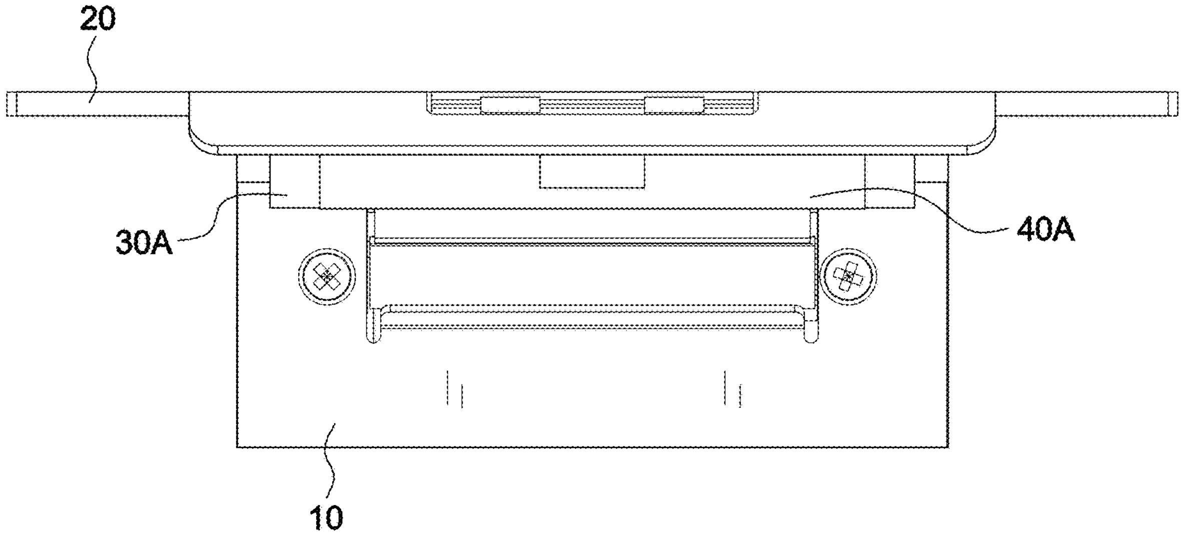
FIG. 6 is a front view of the first embodiment of the present invention.

Referring to FIGS. 1-6, a first embodiment of the present invention includes: an electronic lock body 10, having a housing cavity 11 and a latch bolt 12, with a pair of first screw holes 14 provided on the top (or plate-facing) surface of the electronic lock body 10 and respectively positioning on opposing sides of the housing cavity 11; a plate 20, with a pair of first positioning holes 23 each provided at a position to align with a corresponding first screw hole 14, using plate screws 13 to engage with the first screw hole 14 of the electronic lock body 10, and beside covering the electronic lock body 10, the plate extended upward and downward to the opening side of the plate 20, further having a gap 21 for exposing the housing cavity 11 and the latch bolt 12; a pair of second positioning holes 24 are provided to the front of the pair of first positioning holes 23 and formed through the plate 20; a fixed adjust element 30A, with a pair of second screw holes 34 each provided at a position to align with a corresponding second positioning hole 24, using adjust (or adjusting) screws 22 to engage with the second positioning hole 24 at a bottom (or body-facing) surface of the plate 20, the middle section of the fixed adjust element 30A is arranged at a rod 31 arranged below the gap 21, and a fixed channel 32 is formed in the middle section; and an active adjust element 40A, having a sleeve slot 41 positioned relative to the rod 31, and having a ramp element 42A corresponding to the latch bolt 12, the active adjust element 40A being sleeved between the bottom surface of the plate 20 and the rod 31; the ramp element 42A having an active channel 43 corresponding in position to the fixed channel 32, and the width of the active channel 43 is narrower than the width of the fixed channel 32.

Figure 7:
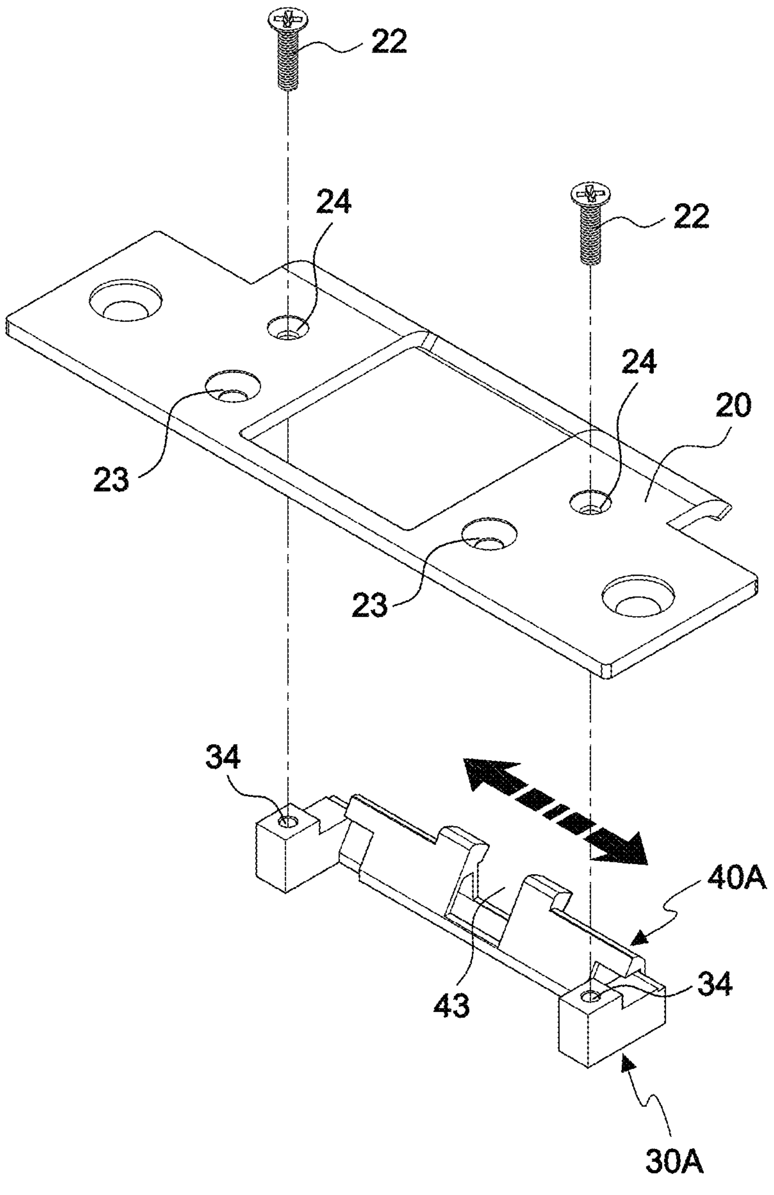
FIG. 7 is a perspective view showing the fixed adjust element and the active adjust element engaged with the plate of the first embodiment of the present invention.
Figure 8A:
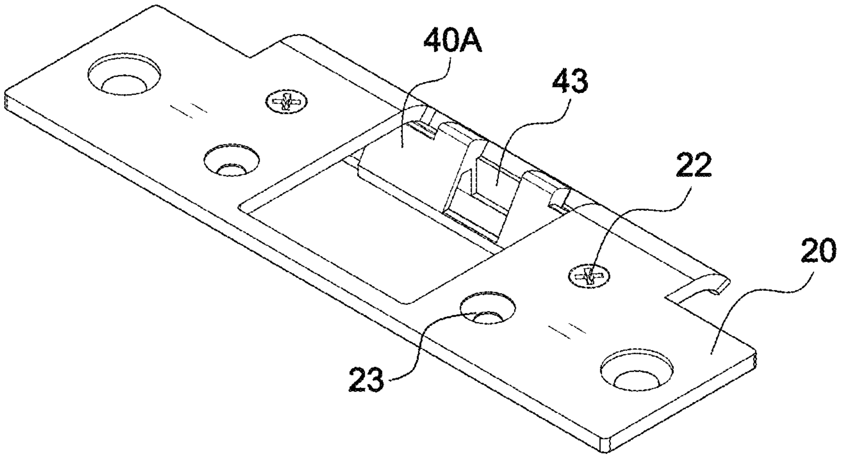
FIG. 8A is a schematic diagram showing the adjustment of the active channel of the first embodiment of the present invention.
Figure 8B:
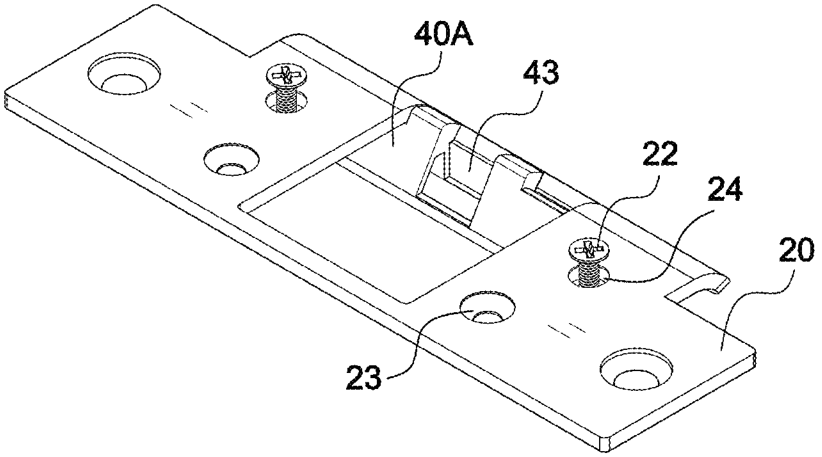
FIG. 8B is a schematic diagram showing the adjustment of the active channel of the first embodiment of the present invention.
Figure 9:
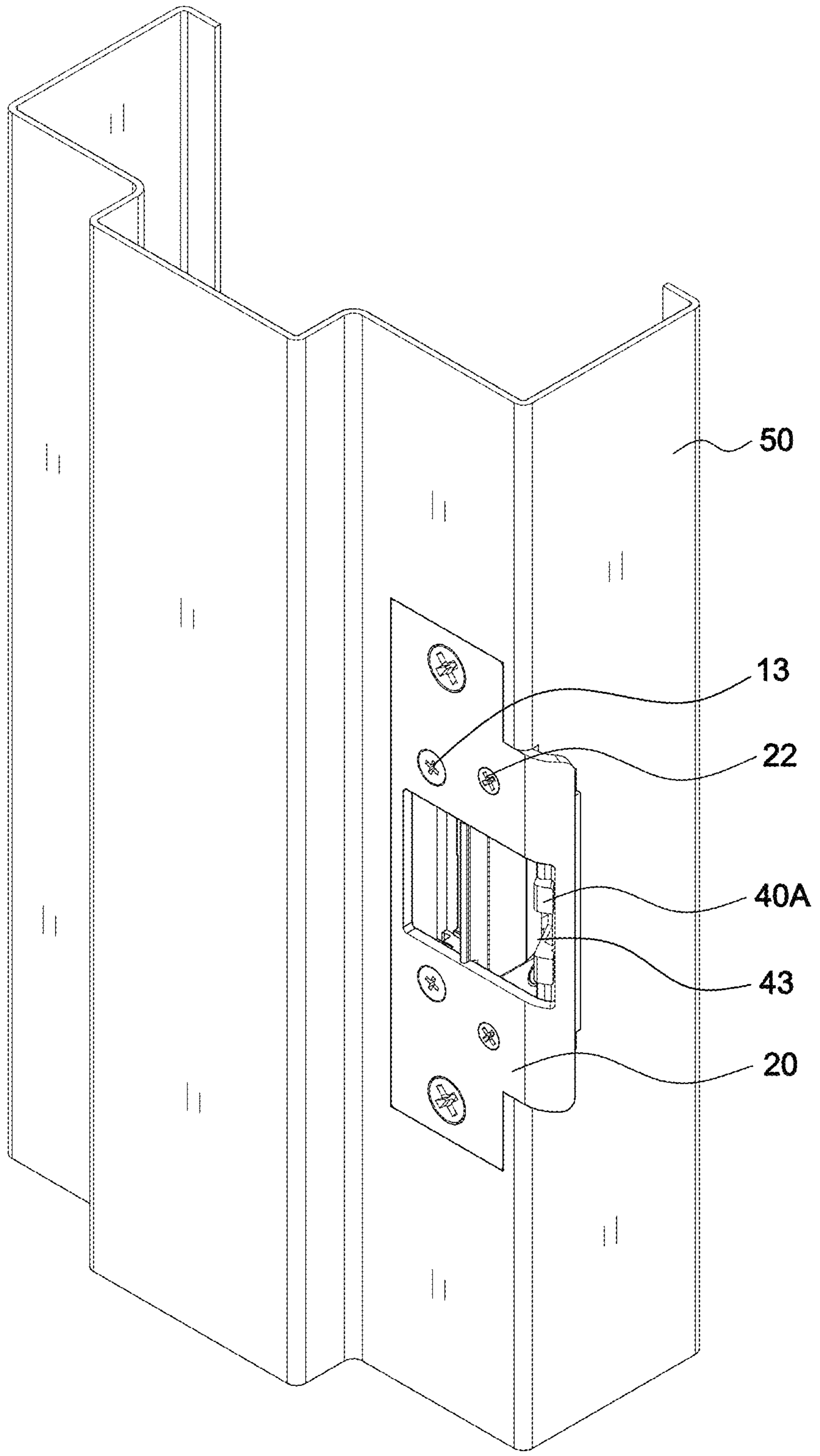
FIG. 9 is a schematic diagram showing the adjustment of the active channel while installed on a door frame in the first embodiment of the present invention.

With the feature disclosed above, referring to FIGS. 7~9, after installing the plate 20 on a door frame 50 so that the housing cavity 11 is aligned with the latch bolt of the mechanical lock box, if the active channel 43 is not aligned with the dead latch of the mechanical lock box, then one may loosen the adjusting screw 22 (the adjusting screw 22 is not removed) to enable the active adjust element 40A and the fixed adjust element 30A to shift relative to each other, and enable the active channel 43 of the active adjust element 40A to be aligned with the dead latch of the mechanical lock box, and then one may tighten the adjust screw 22 to return the active adjust element 40A and the fixed adjustment element 30A to an occlusion state, so the procedure for adjusting the position of the active channel 43 is completed. Therefore, since the occlusal state of the active adjust element 40A and the fixed adjustment element 30A is formed by tightening the adjust screw 22, the active channel 43 located in the active adjust element 40A will not have the problem of offset, and the active adjust element 40A and the fixed adjustment element 30A are arranged at the outer side of the electronic lock body 10, so the position of the active channel 43 can be directly adjusted by loosening the adjust screw 22 from the plate 20, therefore, the present invention does not require one to disassemble the entire electronic lock from the door frame, and one can directly adjust the position of the dead latch channel from the electronic lock plate under the condition that the main structure of the electronic lock is not removed at all, to avoid the malfunction of the electronic lock.

Figure 10A:
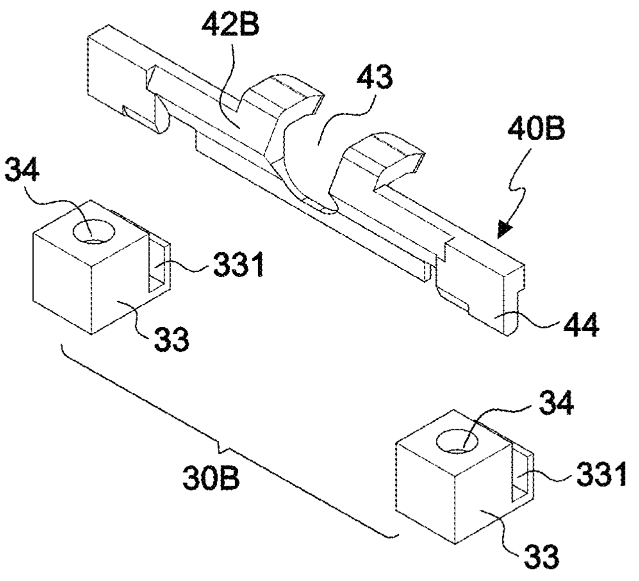
FIG. 10A is an exploded perspective view showing the fixed adjust element and the active adjust element of a second embodiment of the present invention.
Figure 10B:
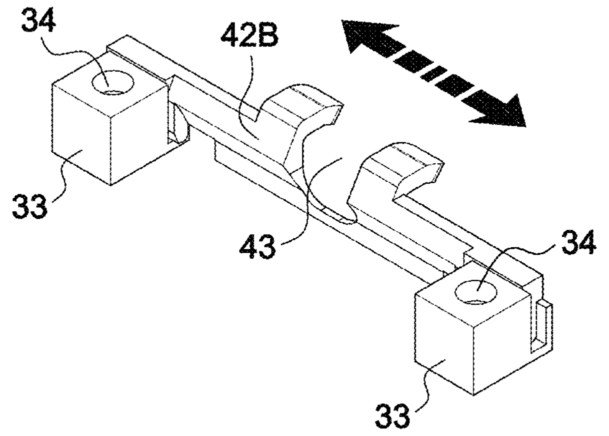
FIG. 10B is an assembly perspective view showing the fixed adjust element and the active adjust element of the second embodiment of the present invention.

Moreover, referring to FIGS. 10A and 10B, a second embodiment of the present invention has a fixed adjust element 30B and an active adjust element 40B in a second form. A pair of second screw holes 34 are each provided on the fixed adjust element 30B at a position to align with a corresponding second positioning hole 24 (not depicted in FIGS. 10A and 10B), namely, on each of a a pair of fixing blocks 33 which form the fixed adjust element 30B. Each fixing block 33 engages the bottom surface of the plate 20 by an adjusting screw 22. Each of the fixing blocks 33 has a sliding slot 331, and a sliding active adjust element 40B has a sliding member 44 at each end to fit to a corresponding sliding slot 331. The top surface of each end of the active adjust element 40B is higher than the top surface of the fixing blocks 33, the active adjust element 40B may be arranged between a bottom (or body-facing) surface of the plate 20 and the fixing blocks 33, the middle section of the active adjust element 40B has a ramp element 42B corresponding relative to the latch bolt 12, the ramp element 42B having an active channel 43, and the width of the active channel 43 is narrower than the distance between the pair of the fixing blocks 33.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An electronic lock with adjustable dead latch channel location, comprising:

an electronic lock body, having:

- a housing cavity formed in a plate-facing surface thereof,
- a pair of first screw holes formed in the plate-facing surface of the electronic lock body, each first screw hole of the pair of first screw holes respectively positioned on opposing sides of the housing cavity, and
- a latch bolt;

a plate with a body-facing surface thereof positioned to abut the plate-facing surface of the electronic lock body, a portion of the plate extending past an edge of the plate-facing surface of the electronic lock body on one side thereof, the plate having:

a pair of first positioning holes formed through the plate, each first positioning hole of the pair of first positioning holes positioned to align with a corresponding first screw hole of the pair of first screw holes, a pair of second positioning holes formed through the plate, a pair of plate screws, each plate screw of the pair of plate screws inserted through a corresponding first positioning hole of the pair of first positioning holes and into a corresponding first screw hole of the pair of first screw holes of the electronic lock body, and a gap formed through the plate and positioned to expose the housing cavity and the latch bolt;

a fixed adjust element disposed outside the electric lock body and adjustable relative thereto, the fixed adjust element having:

a pair of second screw holes formed in a surface of the fixed adjust element, each second screw hole of the pair of second screw holes positioned to align with a corresponding second positioning hole of the pair of second positioning holes of the plate, a pair of adjust screws, each adjust screw of the pair of adjust screws inserted through a corresponding second positioning hole of the pair of second positioning holes of the plate and into a corresponding second screw hole of the pair of second screw holes, a middle section of the fixed adjust element being thereby arranged below the gap of the plate, and a fixed channel formed in the middle section of the fixed adjust element; and an active adjust element, sleeved on the middle section of the fixed adjust element to thereby correspond in position to the latch bolt, the active adjust element disposed outside the electric lock body and adjustable relative thereto, the active adjust element having:

a ramp element, arranged between the body-facing surface of the plate and the middle section of the fixed adjust element, the ramp element having an active channel corresponding in position to the fixed channel, a width of the active channel being narrower than a width of the fixed channel, wherein each adjust screw of the pair of adjust screws is configured, upon tightening thereof, to tightly engage the active adjust element with the fixed adjust element, such that the active channel of the active adjust element is restrained from offsetting.

2. An electronic lock with adjustable dead latch channel location, comprising:

an electronic lock body, having:

a housing cavity formed in a plate-facing surface thereof, a pair of first screw holes formed in the plate-facing surface of the electronic lock body, each first screw hole of the pair of first screw holes respectively positioned on opposing sides of the housing cavity, and a latch bolt;

a plate with a body-facing surface thereof positioned to abut the plate-facing surface of the electronic lock body, a portion of the plate extending past an edge of the plate-facing surface of the electronic lock body on one side thereof, the plate having:

a pair of first positioning holes formed through the plate, each first positioning hole of the pair of first positioning holes positioned to align with a corresponding first screw hole of the pair of first screw holes, a pair of second positioning holes formed through the plate, a pair of plate screws, each plate screw of the pair of plate screws inserted through a corresponding first positioning hole of the pair of first positioning holes and into a corresponding first screw hole of the pair of first screw holes of the electronic lock body, and a gap for exposing formed through the plate and positioned to expose the housing cavity and the latch bolt;

a fixed adjust element disposed outside the electric lock body and adjustable relative thereto, the fixed adjust element having:

a pair of fixing blocks each having a sliding slot, a pair of second screw holes each respectively formed in a surface of a corresponding fixing block of the pair of fixing blocks, each second screw hole of the pair of second screw holes positioned to align with a corresponding second positioning hole of the pair of second positioning holes of the plate, and a pair of adjust screws, each adjust screw of the pair of adjust screws inserted through a corresponding second positioning hole of the pair of second positioning holes of the plate and into a corresponding second screw hole of the pair of second screw holes; and an active adjust element arranged between the pair of fixing blocks and a body-facing surface of the plate, the active adjust element disposed outside the electric lock body and adjustable relative thereto, the active adjust element having;

a sliding element formed on each end of the active adjust element to fit to a sliding slot of a corresponding fixing block of the pair of fixing blocks, a top surface of each end of the active adjust element being higher than a top surface of the pair of fixing blocks, and a ramp element arranged on a middle section of the active adjust element and corresponding in position to the latch bolt, the ramp element having an active channel, a width of the active channel being narrower than a width of the fixed channel, wherein each adjust screw of the pair of adjust screws is configured, upon tightening thereof, to tightly engage the active adjust element with the fixed adjust element, such that the active channel of the active adjust element is restrained from offsetting.

* * * * *